Sept. 30, 1958   J. A. McCARTHY ET AL   2,854,316
PROCESS FOR PURIFYING SILICA
Filed Feb. 3, 1955

INVENTORS
JOSEPH A. McCARTHY
EDWARD M. ALLEN and
BY EDWARD L. PRIEBE

Oscar L. Spencer
ATTORNEY

United States Patent Office 2,854,316
Patented Sept. 30, 1958

2,854,316

PROCESS FOR PURIFYING SILICA

Joseph A. McCarthy, Wadsworth, Edward M. Allen, Doylestown, and Edward L. Priebe, Akron, Ohio, assignors to Columbia-Southern Chemical Corporation, Allegheny County, Pa., a corporation of Delaware Application February 3, 1955, Serial No. 486,002

9 Claims. (Cl. 23—182)

This invention relates to the purification of finely divided particles of silica generally prepared in the manner hereinafter disclosed. When an alkali metal silicate is reacted with an acid under specific conditions an essentially agglomerated and filterable form of silica results therefrom. If, for instance, sodium silicate is reacted with carbonic acid or other acid the product slurry contains up to about 3 percent by weight of $Na_2O$ combined therewith and/or up to about 7 or 8 percent by weight of polyvalent cations such as aluminum, iron, or the like, measured as their oxides, as well as appreciable amounts (0.5 to 5 percent by weight) of cations due to the presence of alkali metal salt such as sodium carbonate, sodium bicarbonate, sodium chloride, etc.

By controlling the reaction conditions it is possible to effect precipitation of silica particles having an average ultimate particle size below 0.1 micron, usually 0.015 to 0.05 micron, by addition of acid or acidic material to alkali metal silicate. These fine particles form flocs or agglomerates which are somewhat larger in size, ranging from 0.1 to 10 microns usually, most of the particles being in excess of 1 micron, 40 percent or more being in the range of 2 to 7 microns.

Although the ions appearing in the product slurry may be effectively removed by washing and acid extraction, this process of purification leaves much to be desired in that cumbersome equipment is necessary, thereby making the process expensive and difficult. Furthermore, the slurry itself has ion exchange properties.

It has been found that such filterable silicas which contain an appreciable concentration, usually ranging from 0.5 to 5 percent by weight, of alkali metal ion, such as Na+ and/or $Na_2O$, measured as $Na_2O$, may be purified by incorporating them, in presence of water, with an ion exchange resin in pulverulent form, but having a particle size substantially larger than that of the silica flocs subjected to treatment, selectively separating the resin from the resulting silica slurry and then recovering the treated silica essentially free from resin. Cations may be thus removed by mixing the silica with a cation exchange resin in the hydrogen or acid form in an amount sufficient to reduce the pH of the resulting slurry below 5, preferably in the range of 1 to 4. Anions may be removed by treating the slurry with an anion exchange resin.

Serious difficulty has been encountered in providing a convenient method of separating resin from the silica. Since both the silica and the resin are filterable, filtration or centrifugation of the silica-resin mixture to effect separation results in entrainment of silica on the resin, thereby requiring a further purification of the resin. Selective settling of the resin in the silica-resin mixture and decanting the silica slurry before substantial settling of silica on the resin can occur, although a workable process, has the disadvantage that a considerable amount of resin remains interspersed throughout the silica or vice versa.

According to this invention, it has been found that ions can be effectively removed by treatment of precipitated silica with an ion exchange material or resin having a particle size above that of the flocs or agglomerates of the silica subjected to treatment and separation of the resin from the silica in a simple manner. Now it has been found that this separation can be effected conveniently and without serious entrainment of silica by passing the silica-resin slurry through a screen or sifting zone having a pore size or perforations such that silica passes through and resin is retained by the screen and moves laterally along the surface of the screen to the edge or periphery thereof. This movement which may be effected by shaking the screen should be sufficiently rapid so that the individual particles of resin on the screen are in almost constant motion and accumulation of resin particles on the screen to an excessive depth is prevented. That is, the resin should not be permitted to collect on the screen to the point where particles pile one upon the other to form a layer in excess of about two inches in depth. For best results the rate of movement should be sufficient to prevent establishment of a bed more than about two resin particles deep. By subjecting the resin on the screen to such movement free passage of silica through the screen is assured and establishment of a resin bed which entraps silica particles is prevented.

It has been found, according to this invention, that the problems inherent in the aforementioned separation processes may be handily overcome by passing the silica-resin slurry resulting from the above-described ion exchange purification process through a sieve or screen having multiple perforations therein large enough to admit passage of the silica flocs, but small enough to prevent resin particles from passing therethrough, by agitating said screen or screens in a special manner. Preferably, an 80-mesh screen is used, although even smaller or larger mesh screens may be used depending on the material being treated. Agitation of the screen is best obtained by a shaking device imparting a combination of high speed gyratory and oscillatory motion to every point on the screening surface, with the oscillatory component of the motion increasing from zero at the center of the screen to a maximum at the outer edge of the screen, to produce a positive and uniform distribution of the material on the screen. Desirable in a system of this nature is a means for periodically bumping or obtaining impacts to keep the screen from blinding.

The gyrations and oscillations herein aforementioned are best obtained by means of a sieve shaker system suspended on elastic supports wherein a resulting motion having both horizontal and vertical components is developed by centrifugal driving force applied at right angles to the vertical axis passing through the center of mass of the system. The elastic elements support a shaking table on which is superimposed the sieve container; said elastic elements permit the said shaking table to have a motion determined by relative distribution of masses and points of application of centrifugal driving forces which are internally generated to produce a table motion wherein every point on the table describes a circular or elliptical path and every point simultaneously vibrates in a vertical direction through an amplitude proportional to the radial distance of the point on the table from the center of mass.

To explain the purpose and effectiveness of this combined gyratory-oscillatory motion it may be helpful to consider the action of each component separately. A simple horizontal gyratory screening motion is effective but is open to the serious objection that, when used by itself, it results in an aggregation or piling up of the silica-resin mixture being separated, the aggregation occurring at the outer edge of the screen surface due to the centrifugal action of the gyratory motion. This, of course, greatly reduces the active screen area. The oscillatory or progressive vibratory motion by itself produces the opposite effect, the material on the screened surface tending to collect at the center, since the vertical amplitude is at a minimum in that area. Hence, by combining a horizontal gyratory motion with a vertical oscillation about the center in the proper proportion and phase, the gyratory forces tending to move the material to the periphery of the screen and the oscillatory forces tending to move it toward the center are balanced and a uniform distribution of the material over the whole screening area is attained.

This invention will now be explained with reference to the accompanying drawing.

Figure 1:
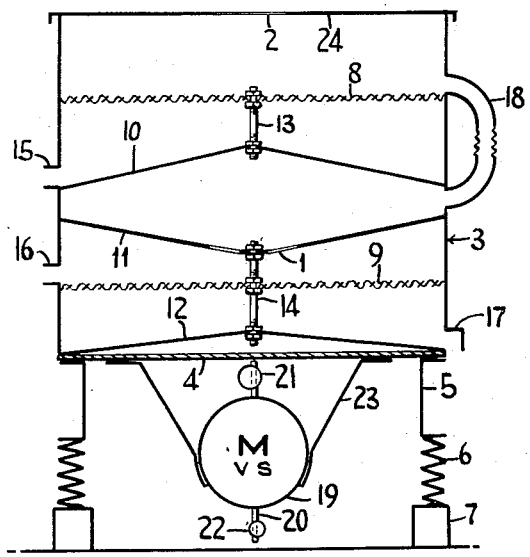
Figure 1 is a view partly in vertical section and partly diagrammatic of one embodiment of a mechanical separator useful for continuous operation.

Figure 1 shows a cylindrical sieve container 3 mounted on square table 4. Such table is supported by legs 5, at each corner, which are in turn mounted on elastic supports 6 supported by bases 7. The sieve container 3 comprises screens 8 and 9 in its upper and lower halves respectively. Below screen 8 and above screen 9 at the center of sieve container 3 are opposed cone-shaped pans 10 and 11. Pan 11 has openings 1 near its apex. Another pan 12 is mounted on the bottom of sieve container 3. Fastening screen 8 to pan 10 is bolt 13 which attaches at the center of screen 8 and at the apex of pan 10. Bolt 14 fastens screen 9 and pans 11 and 12 to each other by attaching at the center of screen 9 and at the apexes of pans 11 and 12. Numerals 15, 16 and 17 designate outlets in the sieve container 3 for the removal of processed material. Reference character 18 designates a conduit running from the periphery of screen 8 to the periphery of distributing pan 11. Sieve container 3 has a cover 24 with a centrally-located opening 2 therein. Screens 8 and 9 may be of the same mesh size or of different mesh sizes. For instance, screen 8 may have an 80-mesh size while the mesh size of screen 9 is 60.

Variable speed motor 19 positioned directly below table 4 has a vertically-positioned shaft 20. Adjustably mounted at the upper and lower extremities of said shaft 20 are eccentrically-mounted weights 21 and 22. The relative magnitude of these weights and their location on the shaft 20 should be such that the moment established by one of the weights (for example, the upper weight) is greater than that established by the other. The motor 19 is suspended from table 4 by means of rigid straps 23 which are securely fastened to the underside of table 4 and to each side of motor 19.

Figure 2:
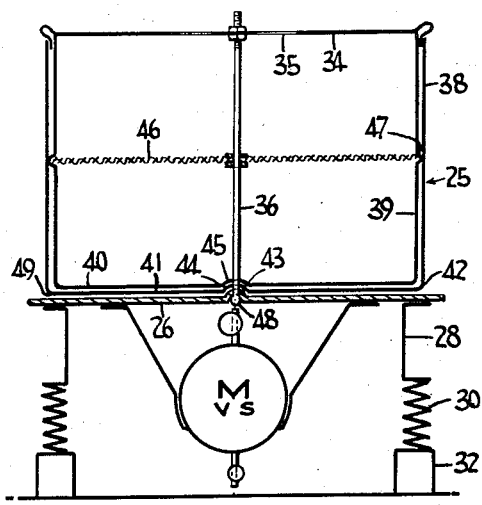
Figure 2 is a view partly in vertical section and partly diagrammatic of a second embodiment of a mechanical separator useful for batch operation.

Figure 2 represents a simpler modification of the apparatus disclosed in Figure 1. Cylindrical sieve container 25 is supported by square table 26 having legs 28, at each corner, each leg being mounted on its corresponding elastic support 30, which, in turn, is mounted on its corresponding base 32.

Sieve container 26 has a cover 34 and centrally-located openings 35 therein. Running through the center of cover 34, through the central axis of the system and through the center of supporting table 26 is retaining rod 36 which is threaded at one end and has a knob 48 at the other. Sieve container 25 comprises outer wall 38, inner wall 39, inner base 40 and outer base 41. Table 26 has rib 43 running through its center from edge to edge. Outer base 41 of sieve container 25 has corresponding rib 44 which, when sieve container 25 is mounted on table 26, receives rib 43 of said table 26 and both ribs run coextensively. Rib 45 of sieve container 25 receives rib 44 of outer base 41 and likewise runs coextensively with ribs 43 and 44. See Figure 3 for enlarged view.

At a point approximately half way between sieve cover 34 and sieve base 40 is screen 46. Said screen 46, whose diameter is slightly greater than the inside diameter of cylindrical container 25, is received and held in place by groove 47 in wall 39 of said container 25. Groove 47 circumferentially encircles wall 39.

Figure 2 has a power unit identical with that in Figure 1, said unit being suspended from table 26 in the very same manner that motor 19 is suspended from table 4, Figure 1.

Figure 3:
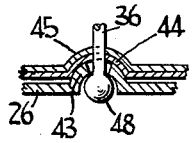
Figure 3 is an enlarged view of a section of Figure 2.

Figure 3 is an enlarged view of knob-end 48 of retaining rod 36 and more clearly demonstrates how it is attached to table 26 and bases 40 and 41 of sieve container 25. It will be noticed that by having an inverted frustroconical opening in rib 43 of table 26, to receive retaining rod 36, sieve container 25 is permitted to rock from side to side on rib 43 of table 48. This permits occasional bumping of edges 42 and 49 of sieve container 25 on the top surface of table 26. It is necessary that ribs 44 and 45 fit tightly against the shaft of retaining rod 36 to avoid escapage of any material in that area. The inner surface of rib 43 at the point where retaining rod 36 penetrates it affords a socket, so to speak, in which knob 48 is permitted to rotate. This, of course, makes possible the aforementioned rocking and occasional bumping.

The manner in which motor 19 of Figure 1, for instance, is suspended allows freedom of movement both horizontally and vertically, making possible a simultaneous gyratory and oscillatory motion. It will be seen that the driving force for the shaking motion is applied by two rotating eccentric weights which generate horizontal centrifugal forces. These forces act radially through and around the central axis of the system and at right angles to it. Weight 21 produces a horizontal gyratory motion, while weight 22 produces a torque which results in an angular displacement or oscillatory motion about the center of mass. Obviously, these forces may be altered by adjusting the position of weights 21 and 22 about the axis.

The vibratory or vertical component of the motion increasing from zero at the center to the maximum at the outer edge of the screen combined with the horizontal gyratory component produce positive distribution of the material over the screening surfaces.

Referring now to Figure 1 of the drawing, a continuous method of purifying a silica-resin slurry will be described. A slurry of finely divided silica, prepared in accordance with Example I, comprising silica flocs, a major portion thereof being in the range of 1 to 10 microns, and containing an ion exchange resin having an average particle size larger than 10 microns, is continuously introduced into the central area of screen 8, an 80-mesh screen having an 18-inch diameter and .007 inch openings. The slurry is fed in such a manner as to avoid flooding the screen, i. e., just enough slurry is added to allow the system to efficiently separate said slurry into two components, the finer silica particles and the larger resin particles. Obviously, by overloading or flooding the screen, much of the finer material finds its way to the periphery by simply being forced there by the weight and size of the load. As stated hereinabove, it is desirable to have not in excess of two inches of slurry on the screen surface, preferably about one-half inch. The gyratory and oscillatory motions resulting from the action of motor 19 cause the finely silica to gravitate through the center of screen 8 and the resin particles to migrate radially to the periphery of screen 8. Finely divided silica passing through screen 8 is collected on pan 10 and, because of the gyratory and oscillatory action of sieve container 3, eventually finds its way to outlet 15. The resin particles which have migrated radially to the periphery of screen 8 because they are too large to find their way through screen 8 eventually exit through conduit 18 and descend to pan 11. Pan 11 directs said particles toward its center because of its cone shape, where the particles pass through openings 1 and to the central area of screen 9, an 80- mesh screen having an 18 inch diameter and .007 inch openings. Here again, because of the horizontal gyrations and vertical oscillations of the sieve container 3, separation of entrained silica particles from the larger resin particles is effected. Finely divided silica descends through the center of screen 9 to pan 12 and migrates to outlet 17. Resin particles migrate radially to the periphery of screen 9 and gradually to exit 16. Thus, a very effective separation of fine particulates is realized, and, obviously, an efficient system results. Substantially all of the finely divided silica is separated from the resin, the resin being contaminated with only .01 to 1 percent by weight of silica. An added modification may be incorporated in the system. Small quantities of water, for instance, may be admixed with the resin descending through conduit 18 in order to facilitate the removal of entrained silica from the resin. Approximately one liter of water per liter of resin, for example, may be used.

Figure 2 shows a system useful for batch operation. By introducing silica-resin slurry, prepared in accordance with Example I, through the openings 35 in the center of cover 34 and subjecting said silica-resin slurry to the horizontal gyrations and vertical oscillations of the system, finely divided silica particles gravitate through 80-mesh screen 46 while the ion exchange resin having larger particle size is retained on the surface of screen 46. Efficient separation is realized because, as in Figure 1, the larger resin particles migrate to the periphery of screen 46 while the smaller finely divided silica particles converge about the center of the screen and gravitate through said screen to the bottom of the sieve container 25.

Silica slurry treated in this way can be obtained surprisingly free from resin. It may be recovered by filtration readily. When dried, for example, by spray drying, a very white, highly pure, freely flowing silica is obtained. No discoloration due to decomposition of residual resin in the product takes place.

The thus prepared and purified finely divided silica has a wide variety of uses. For instance, it may be combined with rubber latex and the latex coagulated to produce rubber having a silica dispersed therein. It may be dried to produce a finely divided silica. An especially light, freely-flowing silica, useful in grease, silicone rubber, natural or GR-S rubber and the like, may be prepared by spray drying the silica slurries formed by treatment of the alkaline filter cake.

The process herein contemplated is especially valuable when the silica is precipitated by adding to an alkali metal silicate a weak acid which has a dissociation constant below about $1 \times 10^{-4}$ for the first hydrogen and which is a gas in its anhydrous state. Typical of such are carbon dioxide, sulphur dioxide and hydrogen sulphide. When such agents are used the predominant anion present is that of the acid (carbonate, sulphite, sulphide, etc.). When the silica is treated with an ion exchange resin in the hydrogen form, not only are the cations removed but also the anions are largely driven off, thus effecting reduction of the anion and cation concentration simultaneously.

In order to remove the metallic cation from the silica effectively it is necessary to use enough cation exchange or otherwise introductive acid to reduce the silica slurry to below about 5, preferably to about 2 to 4. At higher pH removal is not adequate.

The present process is particularly valuable when used in connection with silica which has been acid precipitated under carefully controlled conditions, as hereinafter described, to produce pulverulent silica having a surface area of 25 to 400 square meters per gram, preferably in the range of about 50 to 200 square meters per gram. The surface area of the silica subjected to treatment may be measured by the Brunauer-Emmett-Teller method described in the Journal of the American Chemical Society, volume 60, page 309 (1938). In contrast to a silica sol, the silica particles in such a slurry are in the form of flocs of loosely agglomerated particles, the flocs being highly porous. Thus, while the ultimate particle size as observed by the electron microscope is in the range of 0.015 to 0.05 micron, the actual particle size is larger, usually ranging from 0.1 to 10 microns. Precipitation of a silica subjected to treatment according to this invention can be effected readily by addition of carbon dioxide to sodium silicate solution according to the conditions disclosed in an application of Fred S. Thornhill, Serial No. 308,249, filed September 6, 1952. Specific examples of this method of precipitating silica will be disclosed hereinafter. The silica produced by this precipitation method is then filtered and washed to remove dissolved salt from the slurry. The resulting filter cake is then washed at least once with water. Subsequent to this washing the filter cake is subjected to the ion exchange resin as described above.

It is advantageous that the silica slurry resulting from the precipitation process be stabilized prior to the ion exchange step, since the surface area of the silica subjected to this treatment rises seriously and may even rise to a point where the product effectively becomes a gel. Stabilization may be realized by heating the silica in aqueous medium to a temperature above 60° C., preferably 80° C. to 100° C. or above, for a substantial period, preferably for about 30 or more minutes. Such treatment stabilizes the silica so that it is unaffected by the subsequent ion exchange treatment. Alternatively, the silica may be dried at drying temperature (100° or above) and redispersed for treatment according to this invention.

A further factor important in stabilizing the silica is use of substantially the stoichiometric amount or more of acid required to react with the alkali metal silicate to produce the alkali metal salt (as distinguished from the acid salt). Thus, enough acid should be added to the sodium silicate to reduce the amount of combined sodium or like alkali metal below about 3 percent by weight based upon the weight of the silica. It will be understood that some precipitated silica such as that prepared according to the process of preparing silica from calcium silicate described in application of E. M. Allen, Serial No. 283,721, filed April 22, 1952, is sufficiently stable so that no special stabilization thereof is necessary.

Various types of carbonaceous ion exchange resins may be used. Typical types which are useful are those produced by sulphonation of polystyrene and copolymers of styrene with vinyl benzene. See, for example, U. S. Patents 2,366,077, 2,631,127, etc. Other sulphonated insoluble materials of high molecular weight, such as sulphonated vinyl formaldehyde resin, sulphonated lignin or peat, or the like, may be used.

Anion exchange resins useful for the purpose herein contemplated include the amino and like nitrogenous resins such as those derived from styrene and its copolymers. See, for example, U. S. Patent 2,591,573. The resin used should be granular but not too fine; otherwise, it will not selectively settle or otherwise separate from the silica slurry. On the other hand, the resin should be dispersible in the silica water mixture. Products having a particle size of about 10 to 100-mesh have been found suitable.

According to one particular embodiment of this invention, it has been found expedient to wash out from the silica slurry most of the mother liquor which contains dissolved salts. Next, the filter cake is washed with water at least once. The silica is then admixed with an ion exchange resin allowing the mixture to stand with agitation and until it has come to substantial equilibrium and then separating the resin from the silica, as hereinabove disclosed.

An especially effective method, according to this invention, involves the treatment of filter cakes obtained by filtration of silica slurry. Such filter cakes normally contain 12 to 20 percent by weight of solids, the balance being water. After preliminarily washing the filter cake with water, as just mentioned, the resin may be conveniently mixed with such filter cake while limiting the amount (if any) of water added to the mixture so that the silica content does not fall below about 12 percent, based on the silica and water content of the mixture, and separating the resin from the silica slurry. This process is especially valuable when silica slurries having a pH above 6, preferably about 7, are filtered. Filter cakes from such slurries contain an appreciable amount of water and when treated with an acidic ion exchanger reduce to a pH below 7 and thin out to a readily flowable slurry which can be more readily separated from the resin.

This affords a very convenient and simple method of preparing silica in highly pure form. Silica slurry after its separation is washed, if desired, and then filtered at a pH of 5, preferably about 7. The resulting filter cake is then washed with water and subsequently treated with a resin. The slurry is then separated from the resin, as hereinabove disclosed, and dried, for example, by spray drying.

The amount of ion exchange resin used is enough to remove the ions. To remove effectively the cation, the pH of the slurry should be reduced by ion exchanger below 5, preferably about 2 to 4. If desired, the silica slurry may be acidified with the cation exchanger or it may be acidified with other acid and then treated with resin. The latter process adds ions, thus reducing the purity of the product or requiring treatment with an anion exchanger. For most purposes, about one or more pounds of ion exchanger is required per pound of silica in the slurry.

According to a further imbodiment, the slurry may be dried by azeotropic distillation with organic liquid, or the slurry may be filtered and the filter cake dried by azeotropic distillation.

The following examples are illustrative of methods employed to prepare finely divided silica slurries which may be first treated with resin and the silica-resin slurries separated according to this invention, that is, by mechanical means:

*Example I*

17,000 gallons of a sodium silicate solution are placed in a 50,000 gallon tank. This solution contains the sodium silicate $Na_2O(SiO_2)_{3.3}$ in amounts sufficient to establish $Na_2O$ concentration of 20.3 grams per liter. It contains no sodium chloride except a minor amount (less than 0.08 percent by weight) usually present in commercial sodium silicate. The solution is held at a temperature of 167° F., plus or minus 5° F. Carbon dioxide gas containing 10.0 to 10.8 percent by volume of carbon dioxide, the balance being nitrogen and air, is introduced into the solution at a gas temperature of 115° F. to 145° F. and at a rate sufficient to provide 1250 cubic feet of the carbon dioxide gas per minute, measured at 760 millimeters pressure and 0° C. This gas is introduced directly into a turboagitator in a manner to achieve uniform distribution of the gas and the mixture is vigorously agitated. Carbon dioxide introduction is continued at this rate for 8½ hours, at which time about 120 to 140 percent of the theoretical amount of carbon dioxide has been introduced. After this period of 8½ hours, the rate of introduction of carbon dioxide is reduced to 400 cubic feet per minute and the solution is boiled for 1½ hours. The resulting silica has a surface area of about 140 to 150 square meters per gram and is in the form of porous flocs of particles of the size discussed above.

The resulting silica slurry has a pH of about 9.5. This slurry is then filtered and the filter cake is washed twice with water using approximately one gallon of water per pound of dry $SiO_2$ at each wash. The final filter cake contains about 14 percent by weight of solids, 3.9 grams per liter of sodium ion, measured as $Na_2O$. 200 gallons of this cake are admixed with a sulphonated polystyrene cation exchanger (Amberlite IR–120) in the acid form having a particle size of 16 to 17-mesh, said mixture being in the proportion of 5 grams of filter cake per gram of resin. Said resin contains about 50 percent by weight of moisture. The mixture was stirred and then separated in the manner disclosed hereinabove.

In the Fred S. Thornhill application above-mentioned, numerous methods of preparing silica suitable for ion exchange resin treatment and subsequent separation according to the present invention have been described in detail. The following are additional examples:

*Example II*

A 30 gallon, open-top barrel, provided with an agitator consisting of a vertical shaft driven by a one-quarter horsepower motor and having 3 three-inch propellers, was charged with 48 liters of an aqueous solution of sodium silicate $Na_2O(SiO_2)_{3.36}$ containing 20.3 grams per liter of $Na_2O$, about 66 grams per liter of $SiO_2$ and 10 grams per liter of sodium chloride. Carbon dioxide gas, diluted with air to such an extent that the diluted gas has a $CO_2$ concentration of about 10 percent by volume, was introduced into the drum through a stainless steel tube with the discharge end of the tube being located below the bottom of the agitator. The rate of introduction of gas was adjusted so that just the theoretical amount of carbon dioxide needed is introduced into the solution in 24 hours. This carbonation was held substantially constant over the carbonation period. The temperature was maintained at 35° C. during carbonation and the mixture continuously agitated.

After the theoretical amount of carbon dioxide has been introduced, the mixture was heated by direct introduction of steam from a 140 pound steam line to maintain the temperature of the slurry at boiling temperature for a period of about two hours. This mixture is then filtered and the filter cake is washed with water. The final filter cake is then admixed with a sulphonated polystyrene (Amberlite IR–120), as in Example I, and the resulting silica-resin mixture purified in accordance with the present invention, as described above.

*Example III*

A 4,000 gallon rubber-lined tank equipped with a motor-driven turboagitator was charged with a 2700 gallon batch of silicate salt solution prepared by adding hot concentrated sodium silicate to brine in the ratio of 1 to 4 by volume. The sodium silicate solution contained 20.3 grams per liter of $Na_2O$ and the salt solution 17.4 grams per liter of NaCl. The solution after mixing was brought to a temperature of 30° C. by heating with live steam and was then carbonated by bubbling therethrough a gaseous mixture containing 40 percent carbon dioxide and the remainder essentially nitrogen to precipitate silica. The gas was introduced through a 2-inch pipe into the bottom of the tank and entered the solution at a point just under the agitator propeller. The carbonation rate was such as to introduce the theoretical amount of $CO_2$ in 3.5 hours. Agitation of the solution was continued during carbonation.

At the end of 4.5 hours of carbonation, the batch was heated to boiling by injection of live steam. The heating rate was such as to increase the temperature of the solution about 1° C. a minute and, when the boiling point had been reached, the solution was boiled for one hour. During heating and boiling a gas was introduced at a reduced rate.

After standing overnight, the resulting slurry was pumped to a 3 foot by 3 foot wash wheel where the slurry was filtered and the cake washed to remove salt and alkali. The slurry fed to the wash wheel was kept hot by steam-heated coils and hot condensate was used as a wash water. A washed filter cake was reslurried, then again filtered, then reslurried and returned to the precipitation tank where the alkali therein was neutralized with a 10 N HCl to reduce the $Na_2O$ content to 0.5 gram per liter. This material was then filtered again and washed with water.

Although only several processes of producing slurries of pigmentary or pulverulent silica have been described, it will be understood that the process contemplated herein is applicable to various finely divided particles of silica which are present in an essentially agglomerated and filterable form.

Although the instant disclosure has heretofore concerned itself with the purification of silica prepared by acid precipitation of an alkali metal silicate, the novel process herein described is applicable to acid precipitated pigmentary silica prepared by other methods. Silica prepared by acid precipitation of calcium silicate, for example, may be treated in the manner disclosed herein and thereby enhance its purity without the necessity of cumbersome and repetitious steps.

While the present invention has been described with reference to specific details of certain embodiments, it is not intended that such embodiments shall be regarded as limitations upon the scope of the invention except insofar as they are included in the accompanying claims.

We claim:

1. A method of removing ion impurities from finely-divided, precipitated silica which comprises forming an aqueous slurry of said silica and an ion exchange resin having a particle size larger than that of the silica and thereby permitting the ion impurities in the silica to be absorbed by the resin, passing the slurry thus formed through a screen of a size such that silica passes therethrough and resin is retained thereon and preventing the resin of larger particle size collecting on the screen from blocking passage of the silica of smaller particle size by moving the resin particles with respect to the screen surface and in a direction along said surface to the edge of the screen.

2. The process of claim 1 wherein the silica is in the form of flocs of particles which have an average ultimate particle size below 0.1 micron, the flocs being largely below 10 microns and the ion exchange resin particles being in excess of 10 microns in size.

3. In a method for removing ion impurities from finely-divided, precipitated silica, the steps comprising forming an aqueous slurry of said silica and an ion exchange resin, said resin being present in pulverulent form but having a particle size substantially larger than that of the silica, which comprises introducing the slurry into a sifting zone having multiple perforations therein large enough to admit passage of the silica but small enough to prevent passage of the resin, subjecting said zone to a simultaneous horizontal gyratory motion and a vertical oscillatory motion whereby the finely divided silica gravitates through the center of said zone and the resin particles migrate radially to the periphery of said zone.

4. A method of purifying finely divided, precipitated silica comprising silica flocs, a major portion thereof being in the range of 1 to 10 microns, which comprises forming an aqueous slurry of the silica and an ion exchange resin having an average particle size larger than 10 microns, permitting the resin to absorb ion impurities from the silica slurry and then introducing the silica-resin slurry into a sifting zone having multiple perforations therein large enough to admit passage of the silica but small enough to prevent passage of the resin, subjecting said zone to a simultaneous horizontal gyratory motion and a vertical oscillatory motion whereby the finely divided silica gravitates through the center of said zone and the resin particles migrate radially to the periphery of said zone.

5. In a method for removing ion impurities from finely-divided, precipitated silica, the steps comprising forming an aqueous slurry of said silica and an ion exchange resin, said resin being present in pulverulent form but having a particle size substantially larger than that of the silica, which comprises introducing the slurry into the first of a series of two sifting zones having multiple perforations therein large enough to admit passage of the silica but small enough to prevent passage of the resin, subjecting said zones to simultaneous horizontal gyratory motion and vertical oscillatory motion whereby the finely divided silica gravitates through the center of said first zone and is thus removed therefrom and the resin particles migrate radially to the periphery of said first zone and descend to a second sifting zone where substantially all silica particles entrained by the resin are separated therefrom.

6. A method of purifying finely divided, precipitated silica comprising silica flocs, a major portion thereof being in the range of 1 to 10 microns, which comprises forming an aqueous slurry of the silica and an ion exchange resin having an average particle size larger than 10 microns, permitting the resin to absorb ion impurities from the silica slurry and then introducing the silica-resin slurry into the first of a series of two sifting zones having multiple perforations therein large enough to admit passage of the silica but small enough to prevent passage of the resin, subjecting said zones to simultaneous horizontal gyratory motion and vertical oscillatory motion whereby the finely divided silica gravitates through the center of said first zone and is thus removed therefrom and the resin particles migrate radially to the periphery of said first zone and descend to a second sifting zone where substantially all silica particles entrained by the resin are separated therefrom.

7. A method of removing alkali metal ion impurities from finely divided, precipitated silica which comprises forming an aqueous slurry of said silica and a cation exchange resin having a particle size larger than that of the silica and thereby permitting the alkali metal ion impurities in the silica to be absorbed by the resin, passing the slurry thus formed through a screen of a size such that silica passes therethrough and resin is retained thereon and preventing the resin of larger particle size collecting on the screen from blocking passage of the silica of smaller particle size by moving the resin particles with respect to the screen surface and in a direction along said surface to the edge of the screen.

8. The process of claim 7 wherein the alkali metal ions are sodium ions.

9. A method of removing alkali metal ion impurities from finely divided, precipitated silica in the form of flocs of particles which have an average ultimate particle size below 0.1 micron, the flocs being largely below 10 microns in size, which comprises forming an aqueous slurry of said silica and a cation exchange resin having a particle size in excess of 10 microns and thereby permitting the alkali metal ion impurities in the silica to be absorbed by the resin, passing the slurry thus formed through a screen of a size such that silica passes therethrough and resin is retained thereon and preventing the resin of larger particle size collecting on the screen from blocking passage of the silica of smaller particle size by moving the resin particles with respect to the screen surface and in a direction along said surface to the edge of the screen.

References Cited in the file of this patent

UNITED STATES PATENTS

| | | |
|---|---|---|
| 2,284,671 | Meinzer | June 2, 1942 |
| 2,326,323 | Benedict | Aug. 10, 1943 |
| 2,409,861 | Hunter et al. | Oct. 22, 1946 |
| 2,605,228 | Alexander et al. | July 29, 1952 |
| 2,648,601 | Byler et al. | Aug. 11, 1953 |

OTHER REFERENCES

Kunin et al.: "Ion Exchange Resins," September 1950, pages 109–110.

UNITED STATES PATENT OFFICE
CERTIFICATE OF CORRECTION

Patent No. 2,854,316 September 30, 1958

Joseph A. McCarthy et al.

It is hereby certified that error appears in the printed specification of the above numbered patent requiring correction and that the said Letters Patent should read as corrected below.

Column 5, line 61, for "exchange" read -- exchanger --; column 8, line 1, for "17-mesh," read -- 70-mesh, --.

Signed and sealed this 2nd day of June 1959.

(SEAL)
Attest:

KARL H. AXLINE
Attesting Officer

ROBERT C. WATSON
Commissioner of Patents